United States Patent
Van Keuren et al.

(10) Patent No.: US 11,634,228 B2
(45) Date of Patent: Apr. 25, 2023

(54) HIGH VOLUME FLOW MANAGEMENT OF COOLING AIR

(71) Applicant: Sikorsky Aircraft Corporation, Stratford, CT (US)

(72) Inventors: Kevin S. Van Keuren, Oxford, CT (US); Donald W. Lamb, Jr., North Haven, CT (US); Jose A. Dasilva, Cheshire, CT (US); Malick Daniel Kelly, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 953 days.

(21) Appl. No.: 15/801,057

(22) Filed: Nov. 1, 2017

(65) Prior Publication Data

US 2019/0127072 A1   May 2, 2019

(51) Int. Cl.
*B64D 13/06* (2006.01)
*B64C 7/00* (2006.01)
*B64D 13/00* (2006.01)
B64D 33/02 (2006.01)
B64C 27/04 (2006.01)

(52) U.S. Cl.
CPC ............... *B64D 13/06* (2013.01); *B64C 7/00* (2013.01); *B64D 13/00* (2013.01); B64C 27/04 (2013.01); B64D 2013/0614 (2013.01); B64D 2013/0618 (2013.01); B64D 2013/0651 (2013.01); B64D 2013/0662 (2013.01); B64D 2033/0246 (2013.01)

(58) Field of Classification Search
CPC .......... B64C 7/00; B64D 13/00; B64D 13/06; B64D 13/04; B64D 2013/0614; B64D 2013/0651; B64D 2013/0662; B64D 2033/0246; B01D 45/08; B07B 7/04

USPC ...................................................... 454/76–77
See application file for complete search history.

(56) References Cited

U.S. PATENT DOCUMENTS

| | | | | |
|---|---|---|---|---|
| 3,208,234 A | * | 9/1965 | Messinger | B64D 13/06 62/172 |
| 3,449,891 A | * | 6/1969 | Amelio | F02B 61/04 55/306 |
| 4,358,926 A | * | 11/1982 | Smith | F02C 7/18 415/115 |
| 4,752,185 A | * | 6/1988 | Butler | F01D 11/10 415/116 |

(Continued)

FOREIGN PATENT DOCUMENTS

| | | |
|---|---|---|
| EP | 2409919 A2 | 1/2012 |
| EP | 3001021 A1 | 3/2016 |

OTHER PUBLICATIONS

Bingelis, Tony. "Ventilation Options for Your Homebuilt." EAA Sport Aviation; Jan. 1994, pp. 1-7, www.eaa.org/en/eaa/aircraft-building/building-your-aircraft/while-youre-building/building-articles/cockpit-and-cabin-interior/ventilation-options-for-your-homebuilt [Date Accessed: Mar. 22, 2019].

*Primary Examiner* — Ko-Wei Lin
(74) *Attorney, Agent, or Firm* — Foley & Lardner LLP

(57) ABSTRACT

A flow management system for delivering air to a heat load of an aircraft includes a cover having an opening for receiving and directing an airflow, and a duct defining a non-linear fluid flow path. The fluid flow path operably couples the opening and the heat load. A configuration of the fluid flow path reduces a velocity of the airflow therein while minimizing a pressure drop of the airflow.

17 Claims, 3 Drawing Sheets

(56) References Cited

U.S. PATENT DOCUMENTS

| | | | | |
|---|---|---|---|---|
| 4,798,047 A * | 1/1989 | Geary | ................... | F01D 25/32 |
| | | | | 60/39.092 |
| 5,277,656 A * | 1/1994 | Koukal | ................... | B60H 1/28 |
| | | | | 454/147 |
| 5,662,292 A * | 9/1997 | Greene | ................ | B64D 33/02 |
| | | | | 244/53 B |
| 5,906,111 A * | 5/1999 | Lui | ....................... | B64D 13/06 |
| | | | | 62/402 |
| 6,434,968 B2 * | 8/2002 | Buchholz | .............. | B64D 13/00 |
| | | | | 62/401 |
| 6,595,742 B2 | 7/2003 | Scimone | | |
| 7,296,395 B1 * | 11/2007 | Hartman | ............... | B01D 45/04 |
| | | | | 244/53 B |
| 7,836,701 B2 * | 11/2010 | Zack | ..................... | B64D 33/04 |
| | | | | 60/772 |
| 7,854,778 B2 | 12/2010 | Groom et al. | | |
| 8,424,279 B2 * | 4/2013 | Rajamani | ............. | F04D 29/701 |
| | | | | 60/39.092 |
| 8,439,295 B2 * | 5/2013 | Belyew | ................. | B64D 33/02 |
| | | | | 244/53 B |
| 8,512,450 B2 * | 8/2013 | Kazlauskas | ........... | B64D 33/02 |
| | | | | 95/269 |
| 8,943,791 B2 * | 2/2015 | Tibbott | ............. | B01D 46/0039 |
| | | | | 60/39.091 |
| 9,500,129 B2 * | 11/2016 | Schmittenberg | ......... | F02C 7/05 |
| 9,574,497 B2 * | 2/2017 | Dailey | .................... | F02C 7/04 |
| 9,719,352 B2 * | 8/2017 | Sheoran | ................... | F01D 1/20 |
| 10,036,320 B2 * | 7/2018 | Aubert | ................... | F02C 7/055 |
| 10,077,952 B2 * | 9/2018 | Kenney | .................. | F28F 9/026 |
| 10,266,275 B1 * | 4/2019 | Scimone | ................ | B64D 33/02 |
| 10,267,179 B2 * | 4/2019 | Manning | ............... | F04D 29/701 |
| 10,322,621 B2 * | 6/2019 | Army | ................ | B01D 46/0045 |
| 10,487,848 B2 * | 11/2019 | Chrabascz | ........... | F04D 29/023 |
| 10,508,628 B2 * | 12/2019 | Dionne | ................... | F02B 53/14 |
| 10,612,466 B2 * | 4/2020 | Eastwood | ............. | B64D 33/02 |
| 10,774,788 B2 * | 9/2020 | Feulner | .................... | F02K 3/06 |
| 10,794,273 B2 * | 10/2020 | Perlak | .................... | F02C 3/107 |
| 10,801,410 B2 * | 10/2020 | Roberge | ................. | F01D 15/10 |
| 10,816,014 B2 * | 10/2020 | Nasir | ....................... | F01D 1/14 |
| 2006/0196633 A1 | 9/2006 | Mahjoub | | |
| 2010/0181434 A1 | 7/2010 | Powell et al. | | |
| 2011/0067378 A1 * | 3/2011 | Tibbott | ..................... | F02C 7/18 |
| | | | | 60/39.091 |
| 2014/0024303 A1 | 2/2014 | Stausberg et al. | | |
| 2014/0119891 A1 * | 5/2014 | Schmittenberg | .......... | F02C 7/05 |
| | | | | 415/121.2 |
| 2016/0097401 A1 * | 4/2016 | Beers | .................... | F04D 19/002 |
| | | | | 415/207 |
| 2016/0200441 A1 * | 7/2016 | Truemper | ............... | F25B 47/006 |
| | | | | 62/82 |
| 2017/0363000 A1 * | 12/2017 | Kiszewski | ................ | F02C 3/04 |
| 2017/0370326 A1 * | 12/2017 | Feulner | ..................... | F02K 3/06 |
| 2018/0291925 A1 * | 10/2018 | Chrabascz | .......... | F04D 27/009 |
| 2019/0078514 A1 * | 3/2019 | Eastwood | ............... | F01D 25/32 |
| 2019/0316486 A1 * | 10/2019 | Roberge | .................. | H02K 7/116 |
| 2019/0329899 A1 * | 10/2019 | Edler | ..................... | B01D 45/16 |
| 2020/0172251 A1 * | 6/2020 | Beckman | ........... | B01D 46/0068 |

\* cited by examiner

HIGH VOLUME FLOW MANAGEMENT OF COOLING AIR

STATEMENT OF FEDERAL SUPPORT

This invention was made with government support under FA8629-14-C-2403 awarded by the Air Force. The government has certain rights in the invention.

BACKGROUND

The present disclosure relates to a rotary wing aircraft, and more particularly, to removal of water and particles from an airflow used to cool one or more heat loads of a rotary wing aircraft.

Modern vehicles, such as rotary wing aircraft, generate a large quantity of thermal energy that must be effectively dissipated, i.e., by cooling, to ensure continuous, reliable operation of the avionics/electronic modules, mechanical subsystems and other equipment which is degraded by high temperatures. To dissipate such thermal energy, vehicles typically include an environmental control system (ECS) that provides a temperature/pressure regulated airflow for cooling of the equipment. The regulated airflow may be further utilized for crew comfort.

As aircraft become increasing more complex, the cooling required to counteract the heat load of the equipment must similarly increase. A need therefore exists to provide an environmental control system that has increased operating efficiency, a lower overall system weight, a minimized risk of freezing in low temperature environments, and reduction of particles or other contaminants is desired.

BRIEF DESCRIPTION

According to an embodiment, a flow management system for delivering air to a heat load of an aircraft includes a cover having an opening for receiving and directing an airflow, and a duct defining a non-linear fluid flow path. The fluid flow path operably couples the opening and the heat load. A configuration of the fluid flow path reduces a velocity of the airflow therein while minimizing a pressure drop of the airflow.

In addition to one or more of the features described above, or as an alternative, in further embodiments the non-linear flow path includes a plurality of turns.

In addition to one or more of the features described above, or as an alternative, in further embodiments the non-linear flow path is generally S-shaped.

In addition to one or more of the features described above, or as an alternative, in further embodiments comprising a plurality of louvers disposed within the opening, the plurality of louvers extending at an angle to the opening.

In addition to one or more of the features described above, or as an alternative, in further embodiments the fluid flow path is arranged in communication with an opening formed in the aircraft.

In addition to one or more of the features described above, or as an alternative, in further embodiments the fluid flow path extends beyond both a first side and a second, opposite side of the opening formed in the aircraft.

In addition to one or more of the features described above, or as an alternative, in further embodiments comprising a baffle extending into the fluid flow path at adjacent an aft end of the opening formed in the cover.

In addition to one or more of the features described above, or as an alternative, in further embodiments the duct further comprises a first duct member and a second duct member configured to cooperate with the first duct member to define at least a portion of the fluid flow path.

In addition to one or more of the features described above, or as an alternative, in further embodiments at least one of the first duct member and the second duct member is arranged adjacent an exterior surface of the aircraft, between the cover and the aircraft.

In addition to one or more of the features described above, or as an alternative, in further embodiments the first duct member is coupled to the cover adjacent an aft end of the opening and to the aircraft, the first duct member having a contour generally complementary to a contour of the cover.

In addition to one or more of the features described above, or as an alternative, in further embodiments the second duct member is coupled to the cover adjacent a fore end of the opening and to the aircraft and the second duct member defines a turn in the fluid flow path.

In addition to one or more of the features described above, or as an alternative, in further embodiments the second duct member further includes a first portion arranged at a first angle to the cover and a second portion arranged at a second angle to the cover, the first angle and the second angle being different.

In addition to one or more of the features described above, or as an alternative, in further embodiments condensate collected on a surface of the second portion flows toward the first portion as a result of the second angle and the first angle.

In addition to one or more of the features described above, or as an alternative, in further embodiments at least one opening is formed in a surface of the second duct member, the at least one opening being arranged in fluid communication with a pan for collecting condensate.

In addition to one or more of the features described above, or as an alternative, in further embodiments the at least one opening in the surface of the second duct member contains a mechanism operable to prevent a reverse flow into the flow management system.

In addition to one or more of the features described above, or as an alternative, in further embodiments a lip is arranged adjacent an end of the second duct member, the lip extending generally perpendicular to the second duct member into the fluid flow path.

In addition to one or more of the features described above, or as an alternative, in further embodiments the lip has a non-linear shape across a surface of the second duct member.

In addition to one or more of the features described above, or as an alternative, in further embodiments comprising a third duct member arranged within an interior of the aircraft.

In addition to one or more of the features described above, or as an alternative, in further embodiments a contour of the third duct member defines a turn within the fluid flow path.

In addition to one or more of the features described above, or as an alternative, in further embodiments the cover is capable of resisting impact loading.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
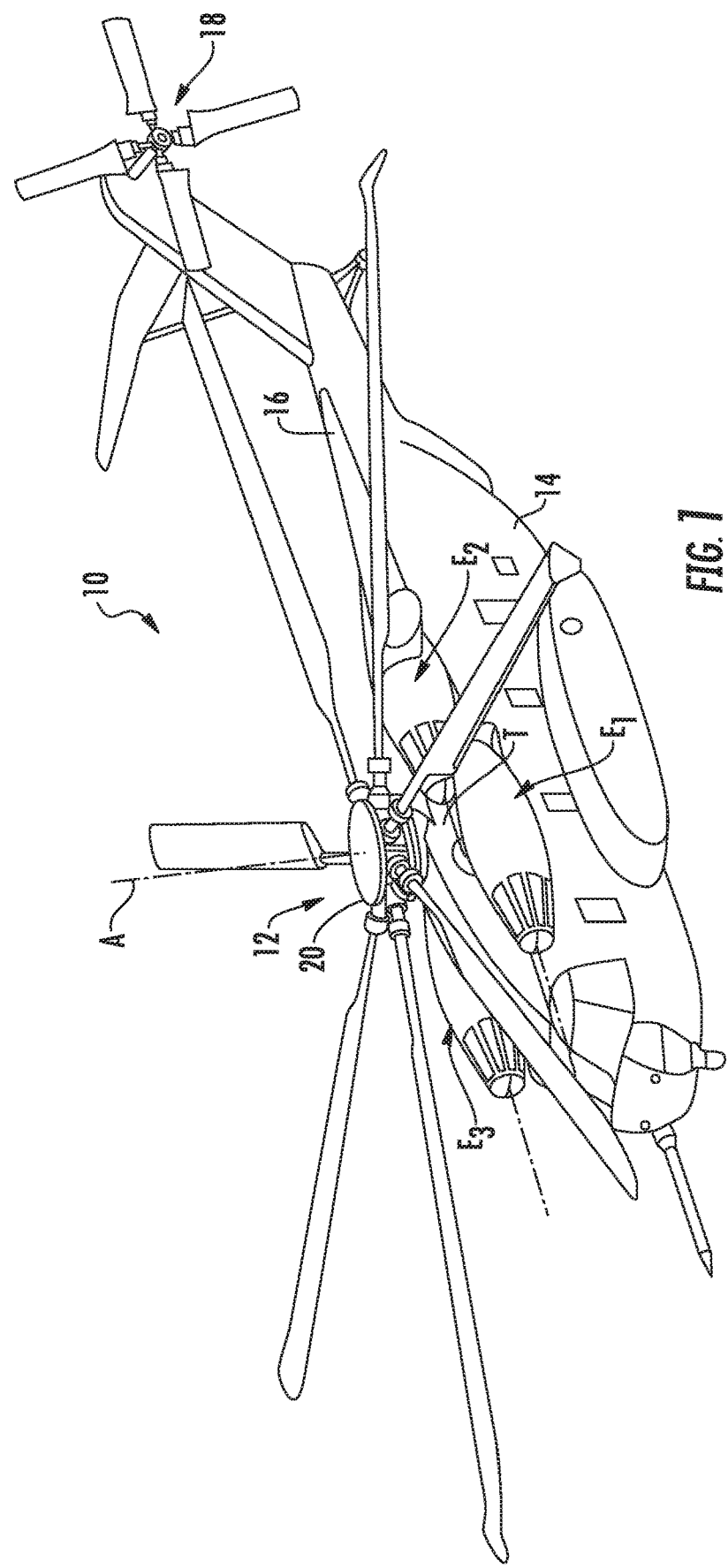
FIG. 1 is a schematic diagram of an example of a vertical takeoff and landing (VTOL) rotary wing aircraft.

FIG. 1 schematically illustrates an example of a vertical takeoff and landing (VTOL) rotary wing aircraft 10. The aircraft 10 in the non-limiting embodiment of FIG. 1 includes a main rotor system 12 supported by an airframe 14 having an extending tail 16 which mounts an anti-torque system 18, such as a tail rotor system. The main rotor assembly 12 is driven about a rotor axis of rotation A through a main rotor gearbox T by one or more engines E (in this example, three engines E1-E3 are shown). The main rotor system 12 includes a plurality of rotor blades 20 configured to rotate about an axis of rotation A. Although a particular helicopter configuration is schematically illustrated in the disclosed non-limiting embodiments, other configurations and/or machines, such as Unmanned Air Vehicles, high speed compound rotary wing aircraft with supplemental translational thrust systems, dual counter-rotating, coaxial rotor system aircraft, tilt-rotors and tilt-wing aircraft in either manned or unmanned configurations will also benefit here from.

A flow management system 30 configured to deliver air to a component bay of the aircraft 10 is mounted adjacent an opening or inlet 22 (see FIG. 3) formed in the airframe 14 of the aircraft 10. Although the flow management system 30 is illustrated as being mounted adjacent a nose of the aircraft 10 and is configured to provide air for cooling a heat load of an adjacent avionics bay (not shown), embodiments where the system 30 is arranged at any position about the aircraft and/or configured to provide cool air to any area, such as an aft avionics bay, tail cone avionics bay, or transmission for example, are contemplated herein.

Figure 2:
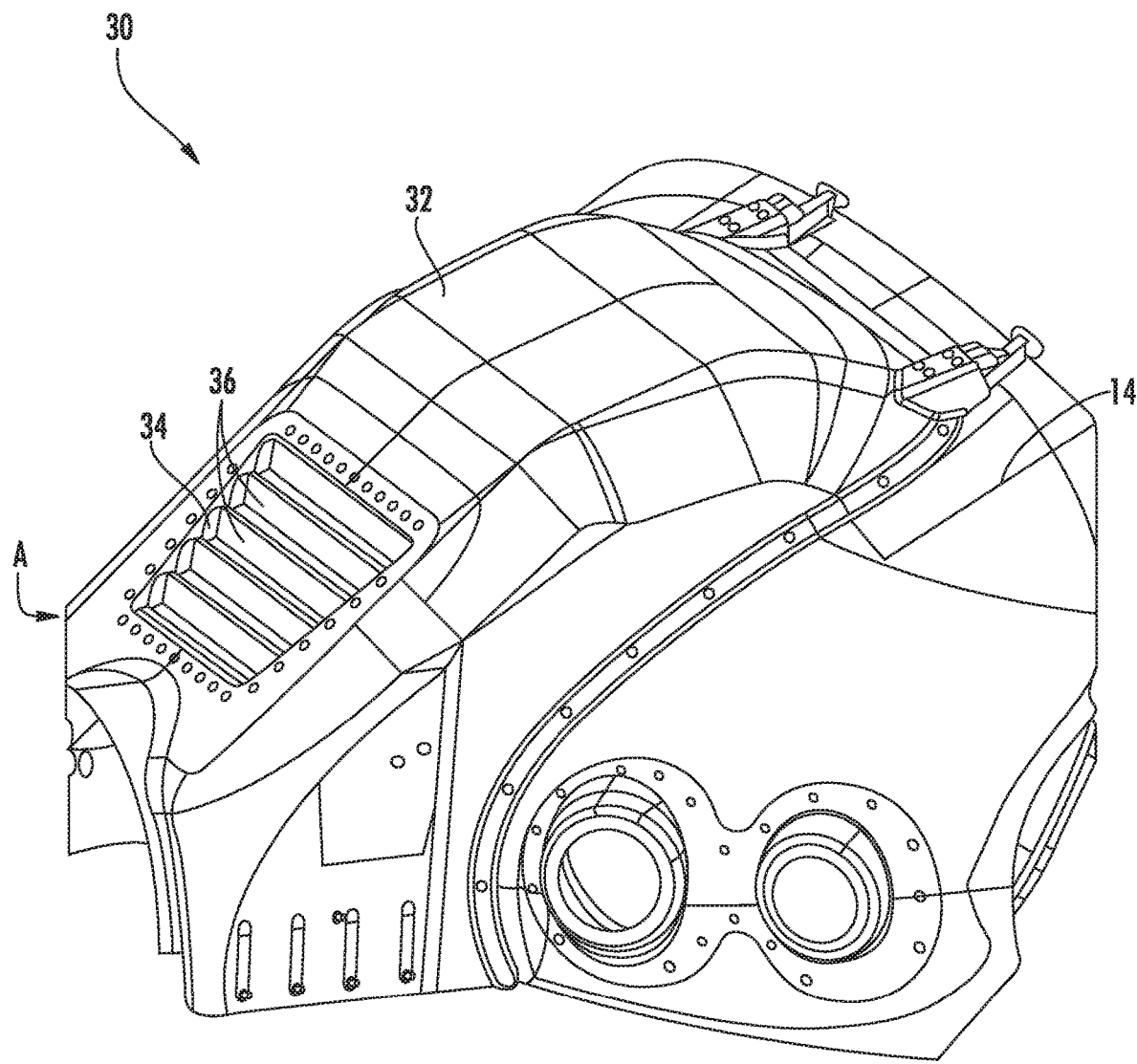
FIG. 2 is a perspective view of flow management system 30 configured to deliver air to a component bay of a rotary wing aircraft according to an embodiment.
Figure 3:
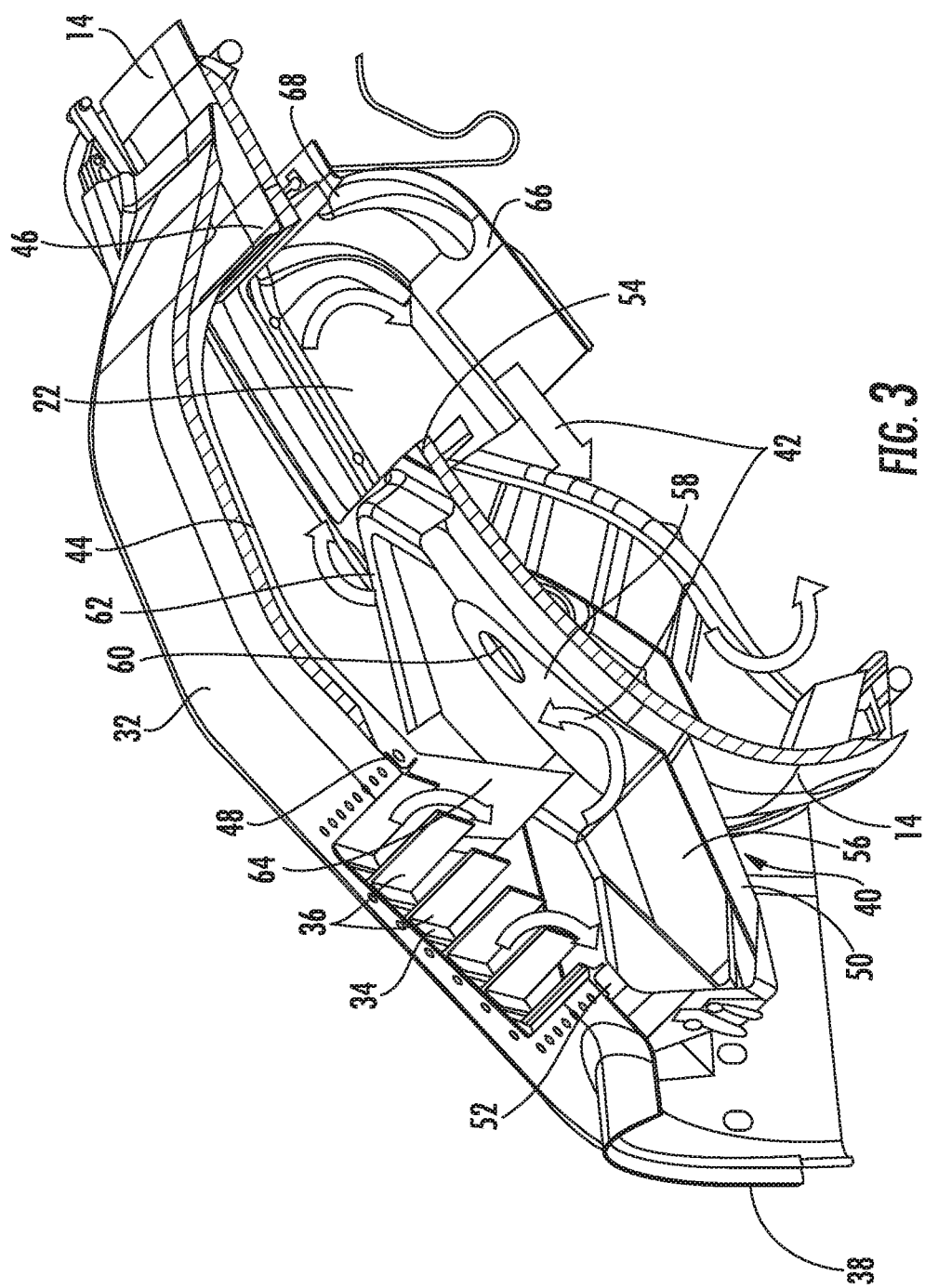
FIG. 3 is a cross-sectional view of the flow management system of FIG. 2 according to an embodiment.

With reference now to FIGS. 2 and 3, the flow management system 30 includes a cover 32 arranged in overlapping relationship with the opening 22 and an adjacent portion of the aircraft 10. In an embodiment, a contour of the cover 32 is selected to enhance the aerodynamic efficiency of the aircraft 10, in a manner similar to a fairing. In an embodiment, the contour of the cover 32 is configured to resist impact loads and direct impacting objects past flow management system toward a wire strike mitigation system such that the cover 32 provides a mechanism for wire strike protection.

The cover 32 includes an opening 34 for communicating ambient air into the flow management system 30. The opening 34 of the cover 32, may be aligned with, or alternatively, may be offset from the opening 22 formed in the airframe 14. In the illustrated, non-limiting embodiment, one or more louvers 36 extend across the opening 34 of the cover 32, perpendicular to the direction of an airflow, to define a plurality of distinct flow channels through which air enters the flow management system 30. The louvers 36 may extend generally vertically, or alternatively, may be angled to direct the air flow through the opening 34 in a desired direction. For example, the louvers 36 may be configured to direct air flowing there through downward and towards a first end 38 of the system 30.

The flow management system 30 additionally includes a duct 40 configured to fluidly couple, via a fluid flow path 42, the opening 34 in the cover 32 and the opening 22 in the airframe 14. In an embodiment, an interior surface of the airframe 14 defines at least a portion of the fluid flow path 42 of the flow management system 30. However, in other embodiments, the entirety of the fluid flow path 42 may be defined by one or more components positioned adjacent and removable relative to the airframe 14. Further, the fluid flow path 42 of the duct 40 is configured to include at least one turn. In the illustrated, non-limiting embodiment, the flow path of the duct is generally S-shaped, such that air within the fluid flow path makes two or more turns.

The duct 40 includes a first duct member 44 connected at a first end 46 to a portion of the airframe 14, and at a second end 48 to the cover 32. In an embodiment, the first end 46 is mounted directly adjacent the opening 22, such that a surface of the first duct member 44 directs air into the opening 22. As shown, the first duct member 44 may be arranged in overlapping relationship with the portion of the cover 32 extending between the aft end of the opening 34 and the airframe 14. In such embodiments, a contour of at least a portion of the first duct member 44 may be generally complementary to the contour of the cover 32. However, embodiments where the contour of the first duct member 44 is different from the cover 32 are also within the scope of the disclosure.

The duct 40 additionally includes a second duct member 50 connected at a first end 52 to the cover 32 and at a second end 54 to a portion of the airframe 14. In the illustrated, non-limiting embodiment, the first end 52 is connected to the cover 32 adjacent the fore end of the opening 34, and the second end 54 is connected to the airframe 14 adjacent the opening 22, opposite the first duct member 44. In an embodiment, the portion of the second duct member 50 connected to the cover 32 defines an end wall of the fluid flow path 42 of the duct 40, thereby restricting a direction of flow as air passes through the opening 34 into the duct 40.

A first portion 56 of the second duct member 50 is disposed directly opposite the opening 32 and has a first orientation relative to the cover 32. A second portion 58 of the second duct member 50 extends from the first portion 56 generally towards the first duct member 44, and has a second orientation relative to the cover 50. In the illustrated, non-limiting embodiment, the second portion 58 is angled upwardly relative to the first portion 56 such that any moisture that condenses on the exposed surface of the second portion 58 is directed away from the fluid flow, towards the first portion 56. One or more openings 60 may be formed in at least one of the first portion 56 and the second portion 58 of the second duct member 50 to fluidly couple the second duct member 50 to an adjacent drain or condensate collector (not shown). In an embodiment, the at least one opening 60 in the surface of the second duct member 50 contains a mechanism operable to prevent a reverse flow into the flow management system. Further, as shown in the FIGS., a lip 62 may extend generally perpendicular to the surface of the second portion 58 into the fluid flow path. The lip 62 is located adjacent the second end 54 of the duct member 50 and may extend across the planar surface of the second portion 58 with an angular shape, such as a V-shape for example.

A baffle 64 extends from a portion of the duct 40, generally adjacent the aft end of the opening 32, into the fluid flow path 42. The baffle 64 may, but need not be, integrally formed with the first duct member 44. Further, one or more surfaces of the baffle 64 may include one or more louvers, slots or other perforations (not shown) that extend into the fluid flow path 42. In an embodiment, the portion of the fluid flow path 42 defined between the free end of the baffle 64 and an adjacent surface of the second duct member 50 has the smallest cross-sectional area of the fluid flow path.

In the illustrated, non-limiting embodiment, a third duct member 66 is positioned adjacent the opening 22, generally opposite the first duct member 44, within the airframe 14. The third duct member 66 is connected to the airframe 14 and includes an end wall 68 that defines a turn within the fluid flow path 42. It should be understood that the flow management system 30 illustrated and described herein is intended as an example only, and that any flow management system 30 configured to remove all or a portion of the condensation and debris from an airflow are contemplated herein.

In operation, an airflow A having condensation and debris particles included therein is provided to the flow management system 30. As the airstream A flows through the opening 34 of the cover 32, large debris particles and water droplets entrained therein may be restricted by the louvers 36 from flowing into the fluid flow path 42. Due to the non-linear configuration of the fluid flow path 42 defined by the flow management system 30, and the increase in the fluid flow path downstream from the baffle 64, the airflow A is slowed while maintaining a velocity sufficient to meet downstream requirements. As the airflow A slows, water droplets within the airflow coalesce on the walls of the flow path. In an embodiment, the initial slowing of the airflow A occurs when the air is in contact with the second duct member 50, at the upstream end of the flow path 42. The water and/or debris that accumulate on the surface of the second duct member 50 flows through the one or more openings 60 formed therein into the adjacent drain pan. The cooling air then progresses through the fluid flow path towards a heat load.

The flow management system 30 illustrated and described herein is configured to reduce or eliminate water and/or debris from an airstream while minimizing a pressure drop of the airstream. The configuration of the flow management system 30, and more specifically or the fluid flow path 42, may be adapted for use in different areas of the aircraft, each being associated with a different flow regime. Factors associated with variation of the system, include, but are not limited to, the location of the opening of inlet 22, attitude, inertial separation, and pressure loss reduction for example.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A flow management system for delivering air within an aircraft, the system comprising:
   a cover having an opening for receiving and directing an airflow; and
   at least one duct defining a non-linear fluid flow path, the fluid flow path operably coupling the opening and an area within the aircraft, wherein the at least one duct comprises a baffle extending from a portion of the at least one duct, wherein a cross-sectional area of the at least one duct downstream of the baffle is greater than a cross-sectional area of the at least one duct upstream of the baffle, and wherein the baffle and a portion of the at least one duct downstream of the baffle reduce a velocity of the airflow within the at least one duct and a pressure drop of the airflow,
   wherein the at least one duct comprises:
      a first duct member; and
      a second duct member configured to cooperate with the first duct member to define at least a portion of the fluid flow path,
   wherein at least one of the first duct member or the second duct member has a first end and a second end and is disposed to contact the cover at the first end and disposed to contact an airframe of the aircraft at the second end;
   wherein the baffle is disposed at the first end such that the baffle is adjacent the opening and extends in a direction away from the cover; and
   wherein a lip is arranged adjacent a terminal end of the second duct member, the lip extending in a direction perpendicular to the second duct member into the fluid flow path, wherein the lip forms a v-shape such that an apex of the lip is disposed at the terminal end of the second duct member, and portions of the lip forming the apex extend away from the terminal end and toward the opening.

2. The flow management system of claim 1, wherein the non-linear flow path includes a plurality of turns.

3. The flow management system of claim 2, wherein the non-linear flow path is generally S-shaped.

4. The flow management system of claim 1, further comprising a plurality of louvers disposed within the opening, the plurality of louvers extending at an angle to the opening.

5. The flow management system of claim 1, wherein the fluid flow path is arranged in communication with an opening formed in the aircraft.

6. The flow management system of claim 5, wherein the fluid flow path extends beyond both a first side and a second, opposite side of the opening formed in the aircraft.

7. The flow management system of claim 1, wherein the baffle extends into the fluid flow path adjacent an aft end of the opening formed in the cover.

8. The flow management system of claim 1, wherein at least one of the first duct member or the second duct member is arranged adjacent an exterior surface of the aircraft, between the cover and the aircraft.

9. The flow management system of claim 1, wherein the first duct member is coupled to the cover adjacent an aft end of the opening and to the aircraft, the first duct member having a contour that is complementary to a contour of the cover.

10. The flow management system of claim 1, wherein the second duct member is coupled to the cover adjacent a fore end of the opening and to the aircraft and the second duct member defines a turn in the fluid flow path.

11. The flow management system of claim 1, wherein the second duct member further includes:
   a first portion arranged at a first angle to the cover; and
   a second portion arranged at a second angle to the cover, the first angle and the second angle being different.

12. The flow management system of claim 11, wherein condensate collected on a surface of the second portion flows toward the first portion as a result of the second angle and the first angle.

13. The flow management system of claim 11, wherein at least one opening is formed in a surface of the second duct member, the at least one opening being configured to receive at least one of water or debris from the surface of the second duct member.

14. The flow management system of claim 11, wherein the lip is arranged to extend across a planar surface of the second portion.

15. The flow management system of claim 1, further comprising a third duct member arranged within an interior of the aircraft.

16. The flow management system of claim 15, wherein a contour of the third duct member defines a turn within the fluid flow path.

17. The flow management system of claim 1, wherein the cover is capable of resisting impact loading.

* * * * *